United States Patent
Nakano

(10) Patent No.: US 9,467,336 B2
(45) Date of Patent: Oct. 11, 2016

(54) INFORMATION PROCESSING SYSTEM AND MANAGEMENT METHOD THEREOF

(71) Applicant: FUJITSU LIMITED, Kawasaki-shi, Kanagawa (JP)

(72) Inventor: Yasumasa Nakano, Fuji (JP)

(73) Assignee: FUJITSU LIMITED, Kawasaki (JP)

( * ) Notice: Subject to any disclaimer, the term of this patent is extended or adjusted under 35 U.S.C. 154(b) by 219 days.

(21) Appl. No.: 13/964,141

(22) Filed: Aug. 12, 2013

(65) Prior Publication Data

US 2014/0089473 A1 Mar. 27, 2014

(30) Foreign Application Priority Data

Sep. 24, 2012 (JP) .................................. 2012-209188

(51) Int. Cl.
*G06F 15/177* (2006.01)
*H04L 12/24* (2006.01)

(52) U.S. Cl.
CPC ......... *H04L 41/0813* (2013.01); *H04L 41/042* (2013.01); *H04L 41/044* (2013.01); *H04L 41/0893* (2013.01)

(58) Field of Classification Search
CPC ............. H04L 41/0893; H04L 41/044; H04L 43/0811; H04L 45/46; H04L 12/2602; H04L 41/046; H04L 41/12; G06F 17/30713; G06F 8/65; H04Q 11/0062; H04Q 2011/0015
USPC ......... 709/220, 221, 223; 370/254, 255, 256
See application file for complete search history.

(56) References Cited

U.S. PATENT DOCUMENTS 7,313,607 B1 * 12/2007 Rosenberg .......... H04L 12/5601
709/220

7,712,102 B2 5/2010 Herington et al.
(Continued)

FOREIGN PATENT DOCUMENTS

| JP | 7-319836 | 12/1995 |
|----|----------|---------|
| JP | 2001-144761 | 5/2001 |

(Continued)

OTHER PUBLICATIONS

Hirai Kouichi et al.,"Operations Management Software for the K computer", Fujitsu Limited, vol. 63, No. 3, pp. 287-292, May 2012 (English Abstract).

(Continued)

*Primary Examiner* — Dustin Nguyen
*Assistant Examiner* — Hao Nguyen
(74) *Attorney, Agent, or Firm* — Fujitsu Patent Center

(57) ABSTRACT

A disclosed management method includes calculating, for each of partitions, a total calculation amount of calculation nodes included in the partition by using calculation amounts managed by a plurality of management nodes, wherein the plurality of calculation nodes, the plurality of management nodes each of which has a storage unit storing calculation amounts of calculation nodes which are management targets, and the management apparatus which manages connection among the plurality of management nodes are included in a system; assigning, for each of the partitions, management nodes among the plurality of management nodes to a predetermined layer in which the management nodes manage calculation nodes included in the partition, based on the total calculation amount of calculation nodes included in the partition; and connecting the plurality of management nodes in a way that management nodes in a layer above the predetermined layer manage the management nodes in the predetermined layer.

4 Claims, 17 Drawing Sheets

(56) References Cited

U.S. PATENT DOCUMENTS

| | | | | |
|---|---|---|---|---|
| 2002/0174207 | A1* | 11/2002 | Battou | G06F 8/65 709/223 |
| 2003/0018652 | A1* | 1/2003 | Heckerman | G06F 17/30713 |
| 2004/0073659 | A1* | 4/2004 | Rajsic | H04L 29/12292 709/224 |
| 2006/0268742 | A1* | 11/2006 | Chu | H04L 41/12 370/254 |
| 2008/0126523 | A1* | 5/2008 | Tantrum | G06K 9/6219 709/223 |
| 2008/0192653 | A1* | 8/2008 | Onodera | 370/256 |
| 2011/0107337 | A1* | 5/2011 | Cambonie | G06F 15/7867 718/102 |

FOREIGN PATENT DOCUMENTS

| | | |
|---|---|---|
| JP | 2007-500386 | 1/2007 |
| JP | 2008-198025 | 8/2008 |
| JP | 2008-234651 | 10/2008 |
| WO | 2005/015397 | 2/2005 |

OTHER PUBLICATIONS

Japanese Office Action mailed Dec. 1, 2015 for corresponding Japanese Patent Application No. 2012-209188, with Partial English Translation, 4 pages.

* cited by examiner

```
ManagementNodeInfo {
Hostname = "pa.fujistu.com"          // HOST NAME
ManageNet = "10.124.10.3"            // INFORMATION ABOUT A MANAGEMENT NETWORK (FOR SOFTWARE COMMUNICATION)
CntrlNet = "10.124.10.2"             // INFORMATION ABOUT A CONTROL NETWORK (FOR HARDWARE COMMUNICATION)
ParentNodeId = "0x0101"              // ID INFORMATION FOR A PARENT NODE
ChildNodeId = "0x0102"               // ID INFORMATION FOR A CHILD NODE
level = "2"                          // HIERARCHICAL LEVEL
NodeType = "JobControlManager"       // NODE TYPE
} 0x0103                             // ID INFORMATION FOR THE NODE ITSELF
```

FIG.5

```
Relation{  // INFORMATION ABOUT PARENT - CHILD RELATIONSHIP
Parent of X2:X1           // MANAGEMENT NODE GROUP X1 IS A PARENT OF MANAGEMENT NODE GROUP X2.
Parent of X3:X2           // MANAGEMENT NODE GROUP X2 IS A PARENT OF MANAGEMENT NODE GROUP X3.
Parent of Computing node: X3  // MANAGEMENT NODE GROUP X3 IS A PARENT OF COMPUTATION NODE GROUP.
}

[201,400] { //RANGE OF THE NUMBER OF COMPUTATION NODES
   The number of X1:2   // THE NUMBER OF MANAGEMENT NODES IN MANAGEMENT NODE GROUP X1 IS 2.
   The number of X2:5   // THE NUMBER OF MANAGEMENT NODES IN MANAGEMENT NODE GROUP X2 IS 5.
   The number of X3:9   // THE NUMBER OF MANAGEMENT NODES IN MANAGEMENT NODE GROUP X3 IS 9.
}
[101,200] { //RANGE OF THE NUMBER OF COMPUTATION NODES
   The number of X1:2   // THE NUMBER OF MANAGEMENT NODES IN MANAGEMENT NODE GROUP X1 IS 2.
   The number of X2:3   // THE NUMBER OF MANAGEMENT NODES IN MANAGEMENT NODE GROUP X2 IS 3.
   The number of X3:4   // THE NUMBER OF MANAGEMENT NODES IN MANAGEMENT NODE GROUP X3 IS 4.
}
[1,100] { //RANGE OF THE NUMBER OF COMPUTATION NODES
   The number of X1:1   // THE NUMBER OF MANAGEMENT NODES IN MANAGEMENT NODE GROUP X1 IS 1.
   The number of X2:2   // THE NUMBER OF MANAGEMENT NODES IN MANAGEMENT NODE GROUP X2 IS 2.

The number of X3:2   // THE NUMBER OF MANAGEMENT NODES IN MANAGEMENT NODE GROUP X3 IS 2.
}
...
```

FIG.6

```
Relation {              // INFORMATION ABOUT PARENT - CHILD RELATIONSHIP
Parent of X1: X2        // MANAGEMENT NODE GROUP X2 IS A PARENT OF MANAGEMENT NODE GROUP X1.
Parent of X2: X3        // MANAGEMENT NODE GROUP X3 IS A PARENT OF MANAGEMENT NODE GROUP X2.
...
Parent of Computing node:Xn    // MANAGEMENT NODE GROUP Xn IS A PARENT OF COMPUTATION NODE GROUP.
}
[100, 1000] {           // RANGE OF THE NUMBER OF COMPUTATION NODES
The number of X1:2      // THE NUMBER OF MANAGEMENT NODES IN MANAGEMENT NODE GROUP X1 IS 2.
The number of X2:20     // THE NUMBER OF MANAGEMENT NODES IN MANAGEMENT NODE GROUP X2 IS 20.
...
The number of Xn:40     // THE NUMBER OF MANAGEMENT NODES IN MANAGEMENT NODE GROUP Xn IS 40.
}
[50,100] {              // RANGE OF THE NUMBER OF COMPUTATION NODES
The number of X1:2      // THE NUMBER OF MANAGEMENT NODES IN MANAGEMENT NODE GROUP X1 IS 2.
The number of X2:2      // THE NUMBER OF MANAGEMENT NODES IN MANAGEMENT NODE GROUP X2 IS 2.
...
The number of Xn:12     // THE NUMBER OF MANAGEMENT NODES IN MANAGEMENT NODE GROUP Xn IS 12.
}
[10,49] {               // RANGE OF THE NUMBER OF COMPUTATION NODES
The number of X1:1      // THE NUMBER OF MANAGEMENT NODES IN MANAGEMENT NODE GROUP X1 IS 1.
The number of X2:2      // THE NUMBER OF MANAGEMENT NODES IN MANAGEMENT NODE GROUP X2 IS 2.
...
The number of Xn:8      // THE NUMBER OF MANAGEMENT NODES IN MANAGEMENT NODE GROUP Xn IS 8.
}
[1,9] {                 // RANGE OF THE NUMBER OF COMPUTATION NODES
The number of X1:1      // THE NUMBER OF MANAGEMENT NODES IN MANAGEMENT NODE GROUP X1 IS 1.
The number of X2:2      // THE NUMBER OF MANAGEMENT NODES IN MANAGEMENT NODE GROUP X2 IS 2.
...
The number of Xn:4      // THE NUMBER OF MANAGEMENT NODES IN MANAGEMENT NODE GROUP Xn IS 4.
}
```

FIG.18

INFORMATION PROCESSING SYSTEM AND MANAGEMENT METHOD THEREOF

CROSS-REFERENCE TO RELATED APPLICATIONS

This application is based upon and claims the benefit of priority of the prior Japanese Patent Application No. 2012-209188, filed on Sep. 24, 2012, the entire contents of which are incorporated herein by reference.

FIELD

This invention relates to a management technique for an information processing system.

BACKGROUND

Large-scale information processing systems (for example, parallel computers such as super computers and the like) that have been developed in recent years may include tens of thousands of computation nodes. In an information processing system, in preparation for a trouble that may occur, a mechanism for steadily monitoring operations is provided. However, in the case of this kind of large-scale information processing system, communication load that occurs due to an exchange of monitoring information and load for monitoring processing at each computation node become too large to ignore.

In one technique, in order to disperse this kind of load for monitoring processing, computation nodes are divided into plural node groups, and management nodes assigned to each computation node group are hierarchized. More specifically, a management node in the bottom layer monitors a computation node group, and a management node in a layer other than the bottom layer (in other words, a management node in a layer above the bottom layer) monitors management nodes in a layer immediately below the layer. In this technique, it is possible to know an amount of computation by computation nodes for each management node in the bottom layer.

Incidentally, a large-scale information processing system such as described above is not only used as a single information processing system, but may also be divided into partitions and used by plural users (for example, company, department, or the like).

When dividing an information processing system into plural partitions, optimizing arrangement of management nodes according to the partitions after division is desirable. However, there may be a difference in processing capability of the computation nodes. In the conventional technique described above, an amount of computation by computation nodes is known for each management node in the bottom layer. Therefore, when simply rearranging the management nodes, processing begins from selecting the computation nodes that each of the management nodes in the bottom layer will manage. The number of computation nodes may be tens of thousands or more, so this processing will take a very long time.

In other words, there is no conventional technique for rearranging management nodes easily when dividing a information processing system into partitions.

SUMMARY

A monitoring method relating to one mode of this invention includes: receiving an instruction which instructs to change a setting for connection among plural management nodes after grouping plural calculation nodes into plural groups, wherein the plural calculation nodes, the plural management nodes which are connected in a certain tree form and manage the plural calculation nodes, and the computer which manages the connection among the plural management nodes are included in an information processing system; specifying for each of the plural groups, a tree form corresponding to the number of calculation nodes included in the group by using a storage unit storing data defining a tree form corresponding to each range of the number of calculation nodes; and changing the setting for the connection among the plural management nodes to generate, for each of the plural groups, a tree of management nodes, which manage calculation nodes included in the group, in the specified tree form.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is a diagram depicting an example of data stored in the node information storage unit;

FIG. 6 is a diagram depicting an example of data stored in the policy information storage unit;

FIG. 18 is a diagram depicting an example of data stored in the policy information storage unit;

DESCRIPTION OF EMBODIMENTS

Figure 1:
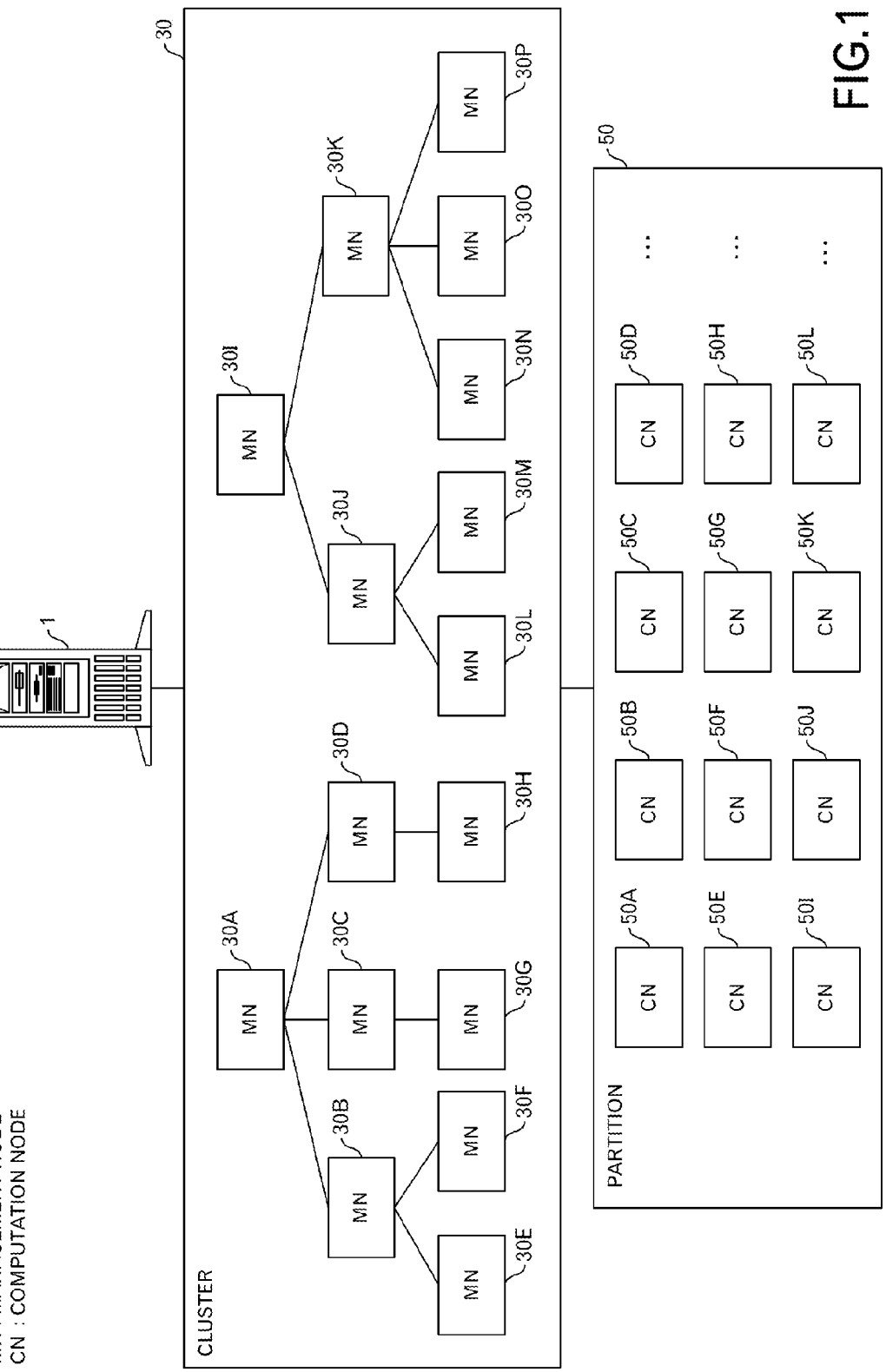
FIG. 1 is a diagram depicting a system outline of this embodiments.

FIG. 1 illustrates a system outline of an embodiment of the present invention. A cluster management apparatus 1 that performs the main processing of this embodiment is connected to a cluster 30 that is to be managed. The cluster 30 includes a node tree that includes management nodes 30A to 30H, and a node tree that includes management nodes 30I to 30P. The cluster 30 is connected to a partition 50 that includes computation nodes 50A to 50L. The computation nodes 50A to 50L may also form a cluster. However, it is not directly related to the processing of this embodiment and is not illustrated in the figures.

The management nodes 30A to 30P that are included in the cluster 30 perform processing for managing the computation nodes 50A to 50L (for example, detecting trouble, assigning programs for executing jobs, updating software, and the like) that are included in the partition 50. However, management nodes that directly manage the computation nodes 50A to 50L are the management modes in the bottom layer of each node tree (in other words, management nodes 30E to 30H, and management nodes 30L to 30P). Management nodes that directly manage the management nodes in the bottom layers are management nodes 30B to 30D, and management nodes 30J and 30K. Management nodes that directly manage the management nodes in the layer one layer above the bottom layer are management nodes 30A and 30I.

Each of the computation nodes 50A to 50L executes a job. The number of management nodes and the hierarchical structure (in other words, form of node tree) of cluster 30 are changed according to the number of computation nodes in partition 50 (in other words, total amount of computation by the computation nodes).

Figure 2:
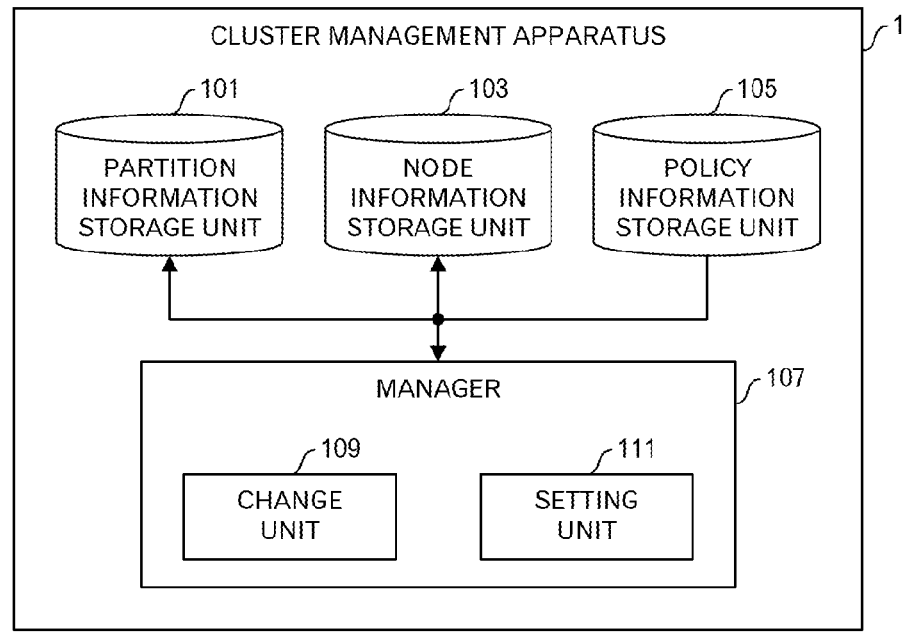
FIG. 2 is a functional block diagram of the cluster management apparatus.

FIG. 2 is a functional block diagram of the cluster management apparatus 1. The cluster management apparatus 1 includes a partition information storage unit 101, a node information storage unit 103, a policy information storage unit 105, and a manager 107 that includes a change unit 109 and a setting unit 111.

The change unit 109 performs processing by using data stored in the partition information storage unit 101, data stored in the node information storage unit 103, and data stored in the policy information storage unit 105, and outputs the processing result to the setting unit 111. The setting unit 111 uses the processing result that was received from the change unit 109, and transmits node information for changing the cluster structure to the management nodes 30A to 30P in cluster 30 and to the computation nodes 50A to 50L in the partition 50.

Figure 3:
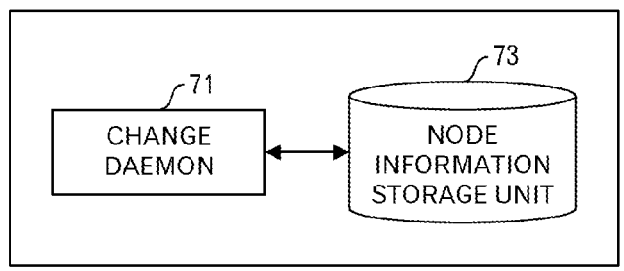
FIG. 3 is a functional block diagram of the management node and the computation node.

FIG. 3 is a functional block diagram of a management node and computation node. A processor (not illustrated in the figure) in a management node and a computation node executes a change daemon 71, which is a kind of resident program that resides in a memory. A management node and a computation node include a node information storage unit 73. The change daemon 71 is a program that stores the received node information in a node information storage unit 73 when node information is received from the setting unit 111 in the cluster management apparatus 1. Moreover, the change daemon 71 also resets and restarts a node according to the received node information. Here, each management node receives, from a calculation node that is being managed by the management node, node information including a "calculation amount" which is the number of tasks, processes or the like. And each management node stores the node information in the node information storage unit 73. Moreover, when there are plural computation nodes that are being managed, each management node performs management of the plural calculation nodes as a calculation node group. And for node information that is being managed, each management node calculates a "total calculation amount" which is a total of the "calculation amounts" received from each of the calculation nodes, and stores the "total calculation amount" in the node information storage unit 73.

Figure 4:
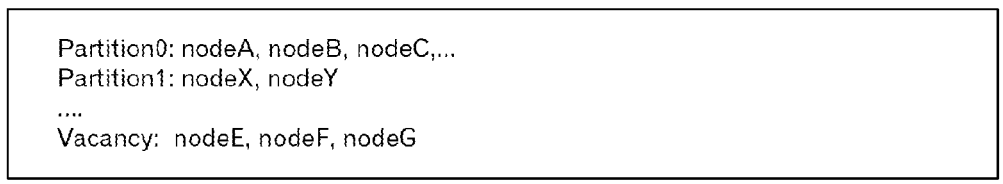
FIG. 4 is a diagram depicting an example of data stored in the partition information storage unit.

FIG. 4 illustrates an example of data that is stored in the partition information storage unit 101 in the cluster management apparatus 1. In the example in FIG. 4, ID (IDentification) information for a partition, and ID information for a management node that manages the partition are stored. ID information for management nodes that are not used is correlated with "Vacancy". When a partition is changed, data stored in the partition information storage unit 101 is updated by the change unit 109.

FIG. 5 illustrates an example of data that is stored in the node information storage unit 103 in the cluster management apparatus 1. FIG. 5 illustrates an example of node information for a management node, where the node information includes a host name, information about a management network, information about a control network, ID information for a parent node, ID information for a child node, hierarchical level, node type, and ID information for the node itself. The node information storage unit 103 stores node information for each of the management nodes and computation nodes in the system illustrated in FIG. 1. When a partition is changed, the data that is stored in the node information storage unit 103 is updated by the change unit 109.

The cluster management apparatus 1 manages node information for each management node in the cluster 30 and for each computation node in the partition 50 in the node information storage unit 103. On the other hand, each management node and each computation node manages its own node information in the node information storage unit 73.

FIG. 6 illustrates an example of data that is stored in the policy information storage unit 105 of the cluster management apparatus 1. In the example in FIG. 6, the number of nodes in each layer of the cluster that manages computation node is stored for each range of the number of computation nodes. Here, the larger a total amount of computation by computation nodes is, the greater the number of management nodes of the bottom layer becomes and the larger the scale of a cluster of management nodes becomes. That is because an amount of processing that management nodes perform increases.

Figure 7:
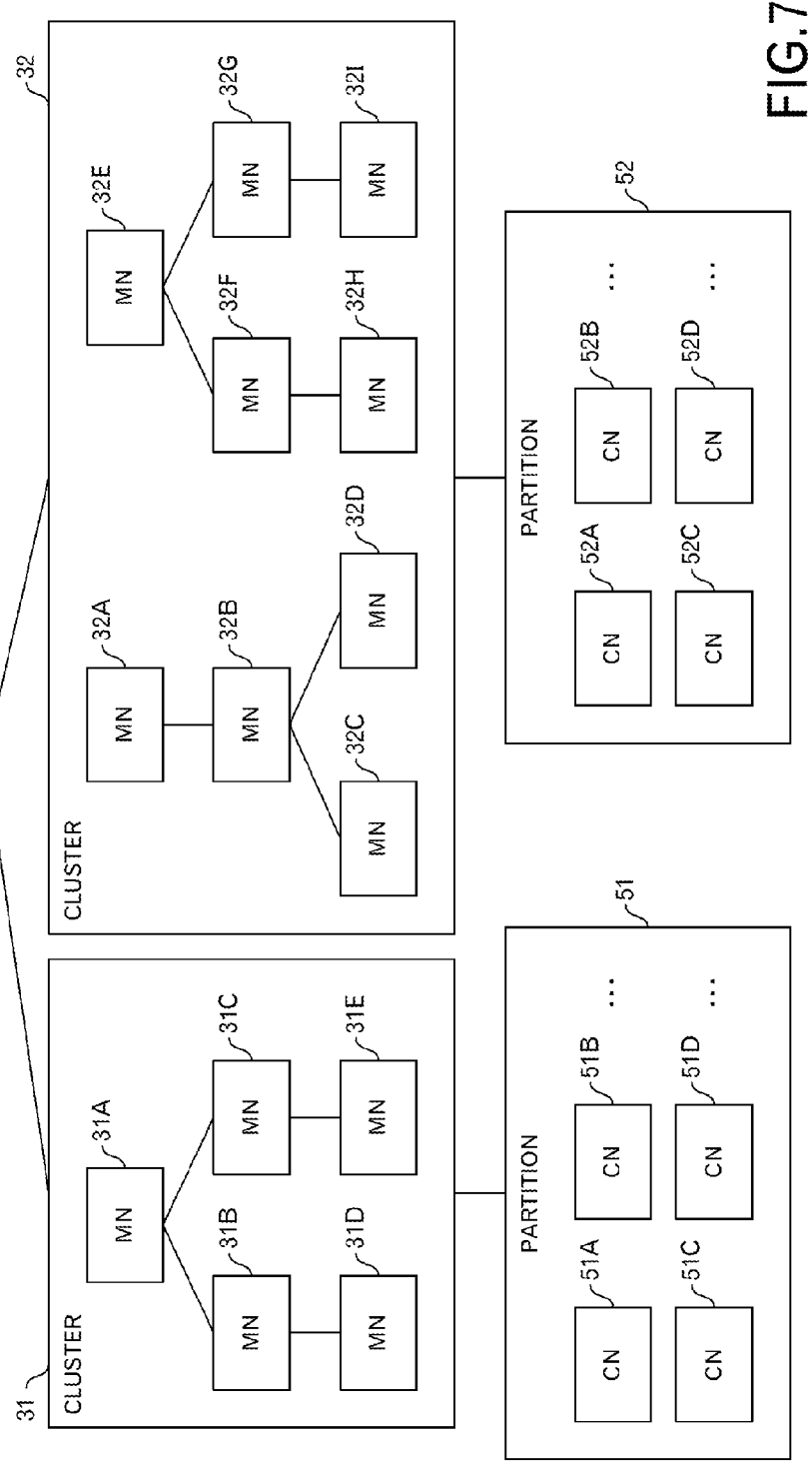
FIG. 7 is a diagram depicting an outline of a system after a change.

Next, an operation of the system of this embodiment will be explained by using FIG. 7 to FIG. 17. In the following, an operation when the system illustrated in FIG. 1 is changed as illustrated in FIG. 7 will be explained as an example. Here, the partition 50 is divided into partitions 51 and 52, and in doing so, the cluster 30 is divided into a cluster 31 that manages partition 51, and a cluster 32 that manages partition 52.

Figure 8:
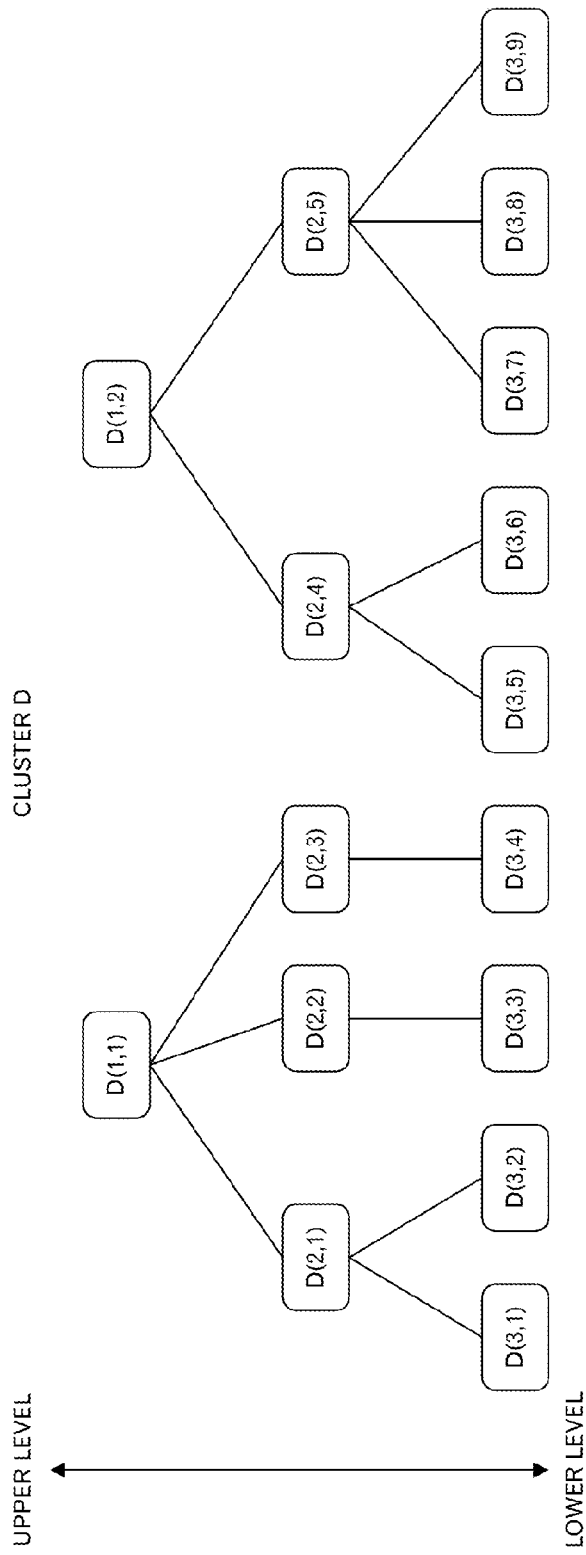
FIG. 8 is a diagram depicting a method of giving information for identifying hierarchical layer level and location in the hierarchical layer to management nodes in a cluster before a change.

Moreover, in order to simplify the explanation, the cluster before the change will be called "cluster D", and each management node in cluster D will be given identification information for identifying hierarchical level and location in a hierarchical layer as illustrated in FIG. 8. For example, when identification information "D(1, 2)" is given to a management node, that management node belongs to the first hierarchical layer and is the second management node in the first hierarchical layer. The clusters that are obtained by dividing cluster D are cluster A (corresponds to cluster 31 in FIG. 7) and cluster B (corresponds to cluster 32 in FIG. 7).

Figure 9:
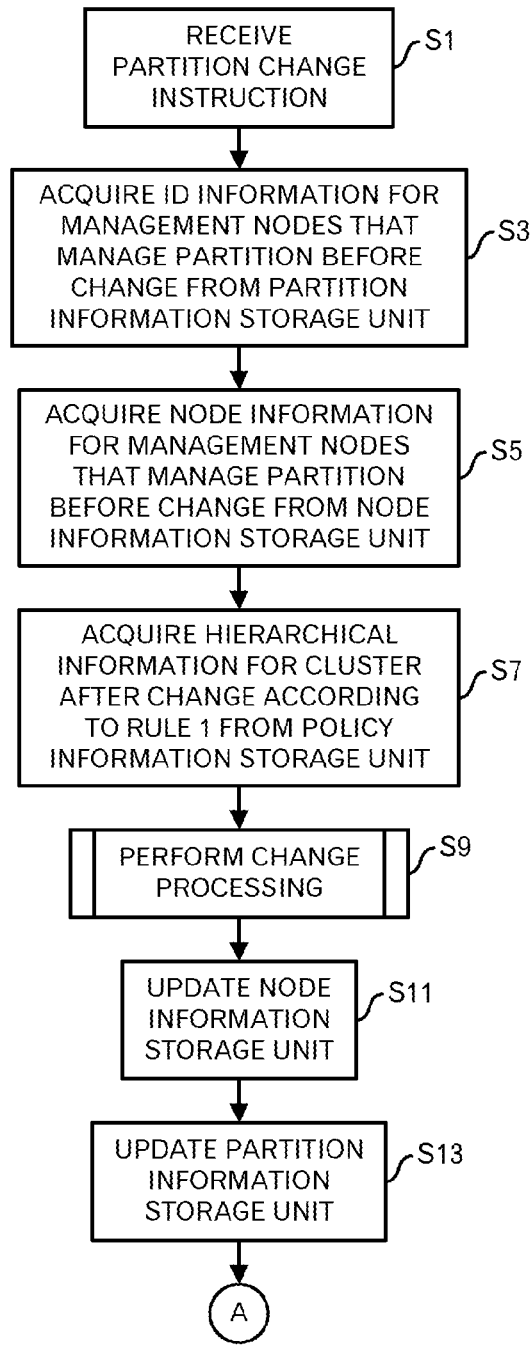
FIG. 9 is a diagram depicting a main processing flow.

First, the change unit 109 in the cluster management apparatus 1 receives an input of a partition change instruction from a user (FIG. 9: step S1). The partition change instruction includes identification information for the partition before the change, the number of computation nodes that are included in the partitions after the change, and identification information for the partitions after the change. Moreover, the partition change instruction also includes an instruction to change a setting for connection among the management nodes 30A to 30P.

The change unit 109 acquires, from the partition information storage unit 101, ID information for management nodes that corresponds to the ID information for the partition before the change (step S3). In other words, the change unit 109 acquires ID information for management nodes that manage the partition before the change.

Then, the change unit 109 acquires, from the node information storage unit 103, node information that corresponds to the ID information for management node acquired in step S3 (step S5). In other words, the change unit 109 acquires node information for management nodes included in the cluster before the change.

The change unit 109 acquires, according to rule 1, hierarchical information (in other words, the number of management nodes in each hierarchical layer) of the clusters after the change from the policy information storage unit 105 based on the number of computation nodes included in the partitions after the change (step S7).

In this embodiment, management nodes are selected from the cluster before the change, and assigned to the clusters after the change according to rules such as described below. The less the rule number is, the higher the priority level is when applying the rules.

1. The number of management nodes in each hierarchical layer in a cluster after the change is determined by using data that is stored in the policy information storage unit 105.

2. Management nodes in a cluster after the change are determined in order from the bottom hierarchical layer to the top hierarchical layer.

3. When determining management nodes in a specific hierarchical layer in a cluster after the change, management nodes that belong to different node trees (in other words, node trees having different management nodes in the top hierarchical layer) in a cluster before the change are preferentially assigned to management nodes that belong to different clusters. When there are no node tree having different management nodes in the top hierarchical layer in a cluster before the change, node trees having different management nodes in a hierarchical layer one layer below the top layer is identified. And the management nodes that belong to the identified node trees are assigned.

4. When determining management nodes of a specific hierarchical layer in a cluster after the change, management nodes, whose parent node (in other words, a management node that is in a hierarchical layer one layer above and is connected to the management nodes) among the management nodes in a cluster before the change is the same, are preferentially assigned to management nodes that belong to the same cluster. In the following, the management nodes are referred to as "sibling nodes". When there are no sibling nodes, management nodes, whose grandparent node (in other words, a management node that is in a hierarchical layer one layer above the parent node and is connected to the parent node) among the management nodes in a cluster before change is the same, are preferentially assigned. In the following, the management nodes are referred to as "grandchild nodes".

5. When determining management nodes in a hierarchical layer one layer above the specific layer after the management nodes in the specific hierarchical layer have been determined according to rule 3 and rule 4, a parent node of the management nodes assigned to the management nodes in the specific hierarchical layer is preferentially assigned to the management nodes in the hierarchical layer. When there is no parent node for a management node assigned to the management node in the specified hierarchical layer, unassigned management nodes are searched for in order from the bottom hierarchical layer to the top hierarchical layer from among the management nodes under a management node that is a common ancestor of the management node that was assigned to the management nodes in the specified hierarchical layer. When there are no such management nodes, unassigned management nodes are searched for in order from the bottom hierarchical layer to the top hierarchical layer from among the management nodes under a different management node in the cluster before the change.

Returning to the explanation of FIG. 9, the change unit 109 performs a change processing (step S9). The change processing will be explained by using FIG. 10 to FIG. 16.

First, the change unit 109 determines Cm (Cm is a candidate of a management node in the bottom layer. Here, m is a natural number that expresses a hierarchical level of the bottom hierarchical layer. In the example of this embodiment, m=3) according to rules 2 and 3 for each cluster after the change (here, these clusters are clusters A and B) (FIG. 10: step S31).

Figure 11:
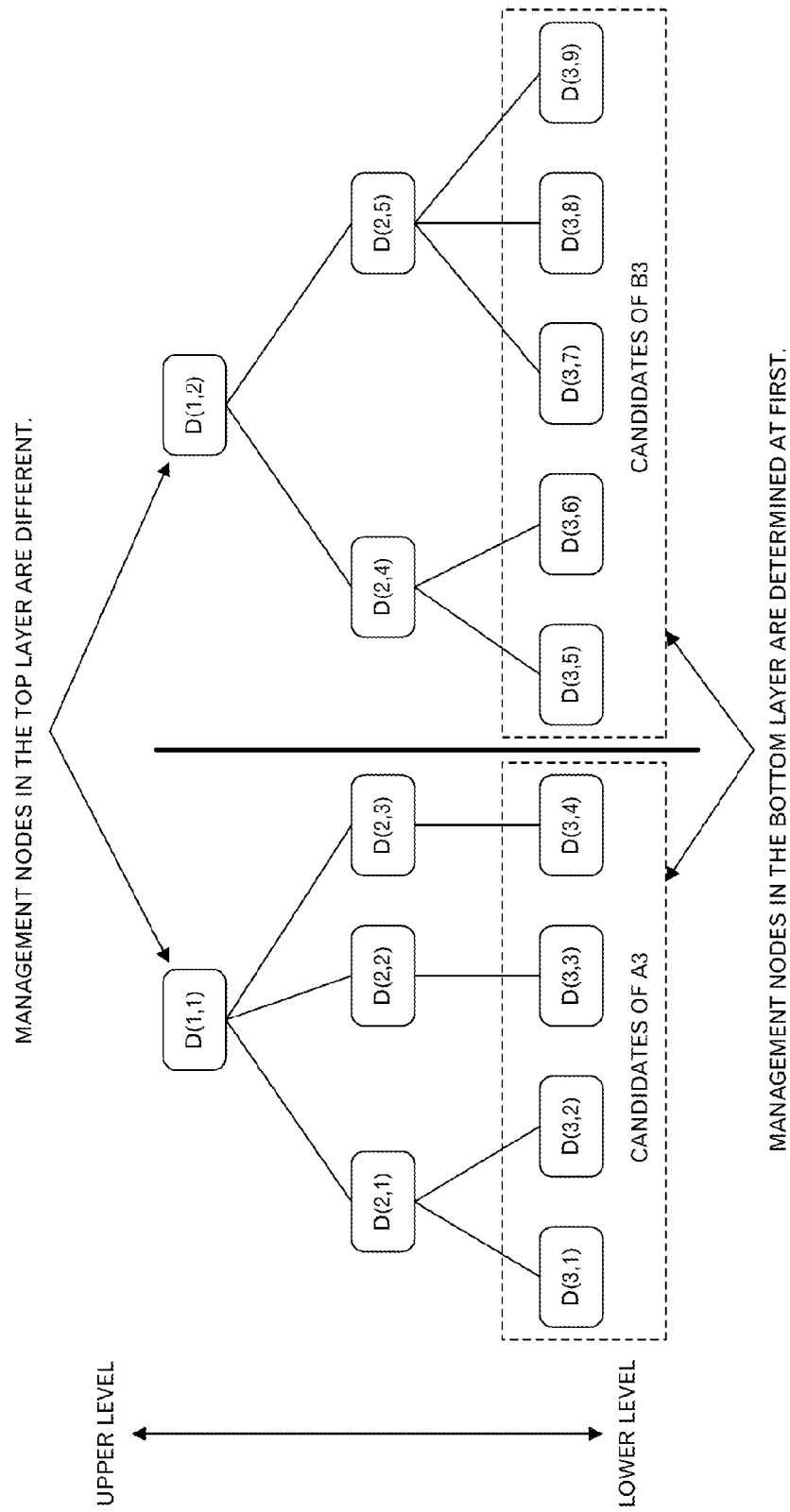
FIG. 11 is a diagram depicting a method of assigning management nodes according to the rules.

As illustrated in FIG. 11, in step S31, the change unit 109 determines candidates of management nodes (Here, management node group A3 and management node group B3) in the bottom hierarchical layers of cluster A and cluster B according to rule 2. Moreover, according to rule 3, the change unit 109 assigns, to cluster A, a management nodes of the node tree including management node D(1, 1), which is a management node in the top hierarchical layer. And the change unit 109 assigns, to cluster B, a management node of the node tree including management node D(1, 2), which is a management node in the top hierarchical layer.

In doing so, when cluster D has plural node trees, it is possible to create plural clusters by utilizing the plural node trees.

Figure 10:
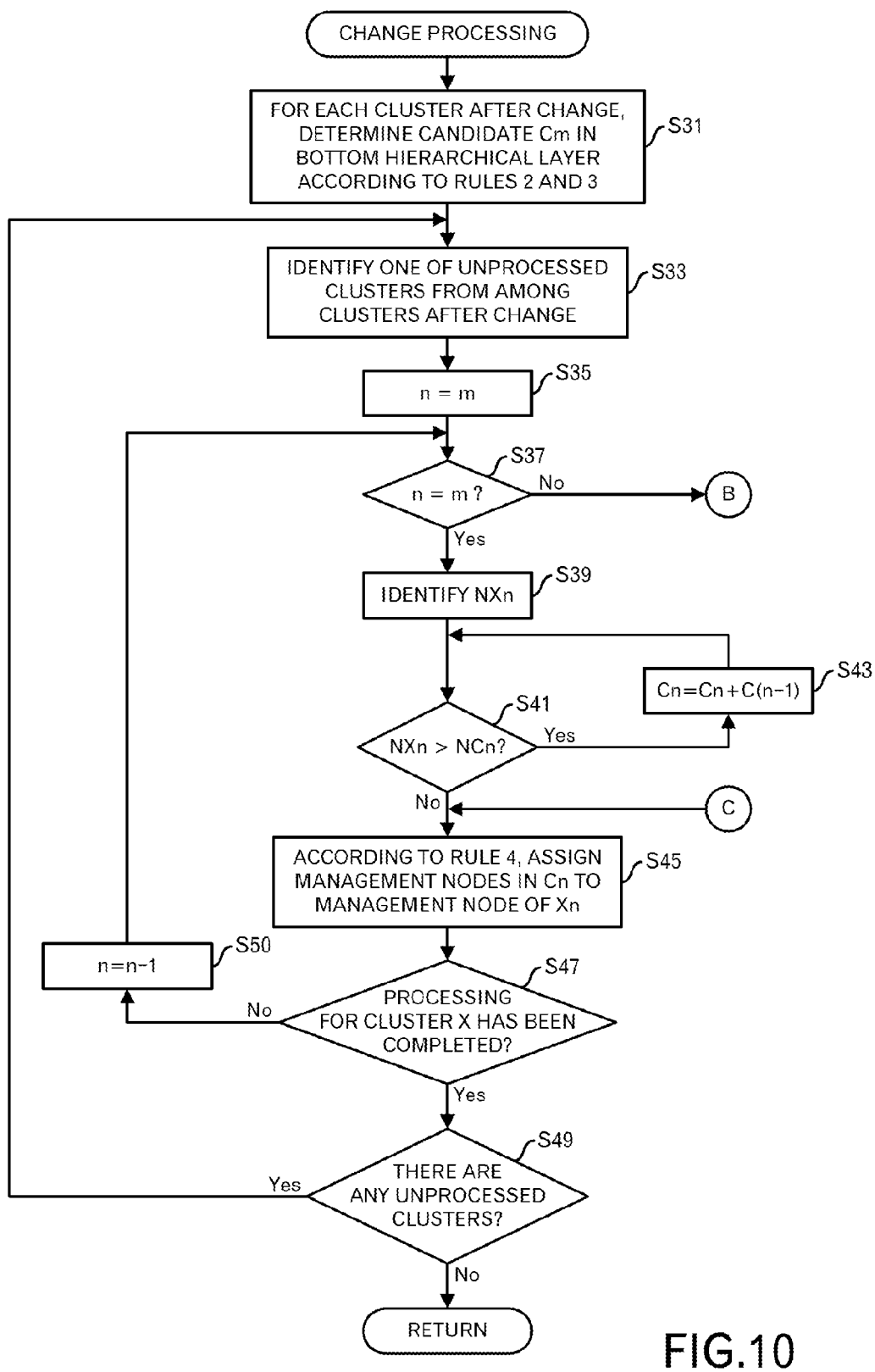
FIG. 10 is a diagram depicting a processing flow of a change processing.

Returning to the explanation of FIG. 10, the change unit 109 identifies one of the unprocessed clusters from among the clusters after the change (in other words, cluster A and cluster B) (step S33). In the following, in order to simplify the explanation, the cluster that is identified in step S33 will be called cluster X.

The change unit 109 then sets a variable n (n is a natural number), which expresses the level of a hierarchical layer, to m (step S35).

Next, the change unit 109 determines whether n equals to m (step S37). When n does not equal to m (step S37: NO route), the layer is not the bottom layer, so processing moves to step S51 in FIG. 13 by way of terminal B.

When n equals to m (step S37: YES route), the layer is the bottom hierarchical layer, so the change unit 109 identifies, from among the number of management nodes in each of the hierarchical layers acquired in step S7, the number of management nodes included in the management node group Xn in the n-th hierarchical layer (step S39).

The change unit 109 determines whether (the number of management nodes included in the node group Xn in the n-th hierarchical layer) is more than (the number of management nodes included in the candidate management node group Cn) (step S41). The number of management nodes included in the node group Xn in the n-th hierarchical layer is referred to as NXn in Figures. The number of management nodes included in the candidate management node group Cn is referred to as NCn in Figures. When (the number of management nodes included in the node group Xn of the n-th hierarchical layer) is more than (the number of management nodes included in the candidate management node group Cn) (step S41: YES route), there are not enough management nodes. So the change unit 109 sets Cn to Cn+C(n−1) (step S43). In other words, the change unit 109 adds a candidate of the management node group one layer above the n-th hierarchical layer. In step S43, for example, the node group in the hierarchical layer one layer above the hierarchical layer to which the candidate management node group Cn belongs is C(n−1).

Figure 12:
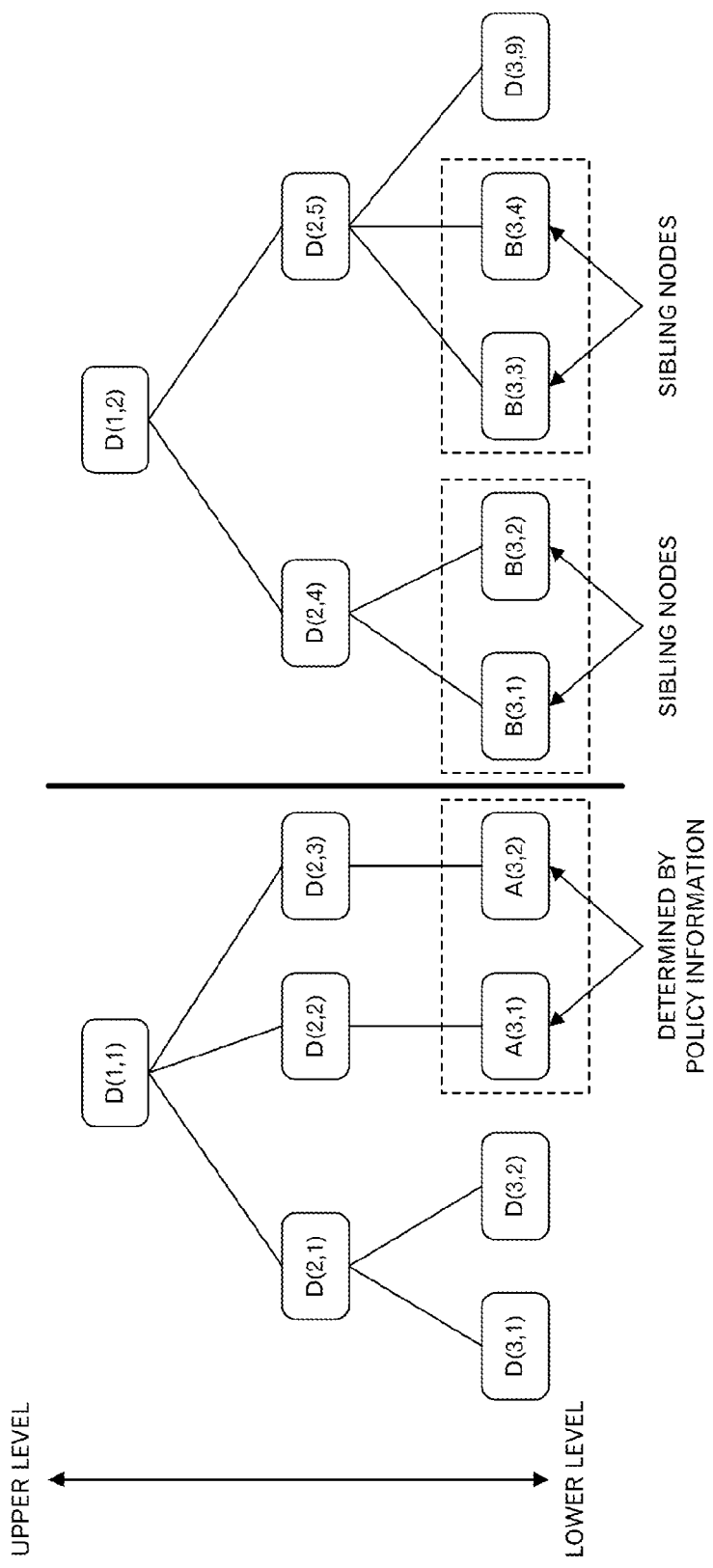
FIG. 12 is a diagram depicting a method of assigning management nodes according to the rules.

When (the number of management nodes in the node group Xn of the n-th hierarchical layer) equals to or is less than (the number of management nodes in the candidate management node group Cn) (step S41: NO route), the change unit 109 assigns, according to rule 4, the management nodes included in the candidate management node group Cn to a management node of the node group Xn in the n-th hierarchical layer (step S45). By the processing in step S45, assignment such as illustrated in FIG. 12 is performed. In other words, management node D(3, 3) is assigned to management node A(3, 1), management node D(3, 4) is assigned to management node A(3, 2), management node D(3, 5) is assigned to management node B(3, 1), management node D(3, 6) is assigned to management node B(3, 2), management node D(3, 7) is assigned to management node B(3, 3), and management node D(3, 8) is assigned to management node B(3, 4). By simply following rule 4, management node D(3, 1) is assigned to management node A(3, 1), and management node D(3, 2) is assigned to management node A(3, 2). However, in cluster A, nodes that belong to the bottom hierarchical layer have a one-to-one correspondence with the nodes that belong to the hierarchical layer one layer above the bottom hierarchical layer. Therefore, as an exception, rule 4 is not applied.

In this way, by using sibling nodes that have a common parent node, it is possible to perform assignment by utilizing the parent-child relationship between nodes in a cluster before the change.

Returning to the explanation of FIG. 10, the change unit 109 determines whether processing for cluster X has been completed (step S47). When processing for cluster X has not been completed (step S47: NO route), the change unit 109 sets n to n−1 (step S50) in order to process the next hierarchical layer, and returns to step S37.

On the other hands, when processing for cluster X has been completed (step S47: YES route), the change unit 109 determines whether there are any unprocessed clusters (step S49). When there is an unprocessed cluster (step S49: YES route), processing returns to step S33 in order to process the next cluster. When there are no unprocessed clusters (step S49: NO route), processing returns to the calling-source processing.

Next, the processing after the terminal B will be explained using FIG. 13 to FIG. 16. First, the change unit 109 identifies, according to rule 5, candidate management node group Cn in the n-th hierarchical layer from assigned parent nodes in the (n+1)th hierarchical layer (FIG. 13: step S51).

Figure 14:
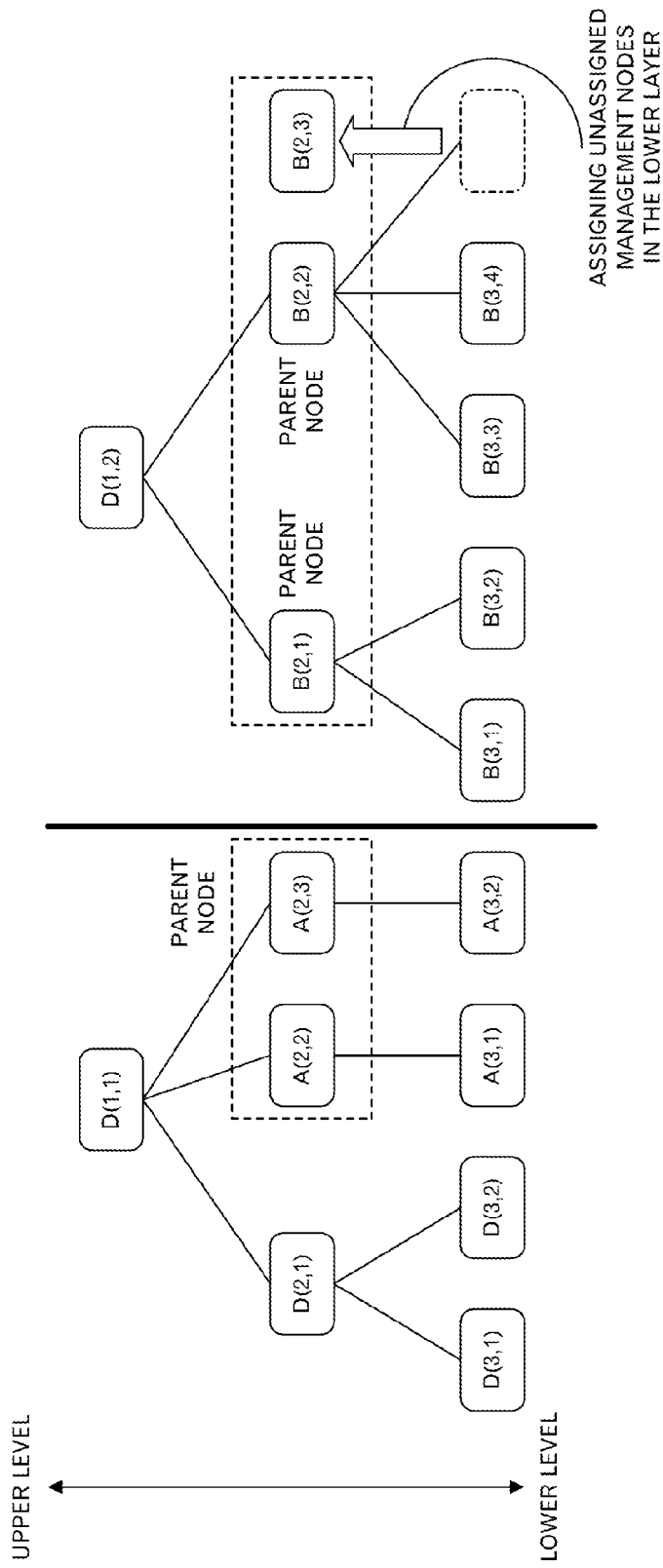
FIG. 14 is a diagram depicting a method of assigning management nodes according to the rules.

As illustrated in FIG. 14, for example, in step S51, parent nodes of management nodes assigned to the third hierarchical layer (here, management node D(2,2) and management node D(2,3)) are assigned to the second hierarchical layer of cluster A. Moreover, parent nodes of management nodes assigned to the third hierarchical layer (here, management node D(2,4) and management node D(2,5)) are assigned to the second hierarchical layer of cluster B. However, the number of management nodes in the second hierarchical layer of cluster B is three, and there are not enough management nodes. Therefore, by the processing of step S55 that will be explained below, management node D(3, 9) that belongs to the third hierarchical layer is assigned to the second hierarchical layer of cluster B.

By performing this kind of assignment, it becomes possible to use parent-child relationship of cluster D as is in cluster A and cluster B. So it is possible to decrease the changes of settings.

Figure 13:
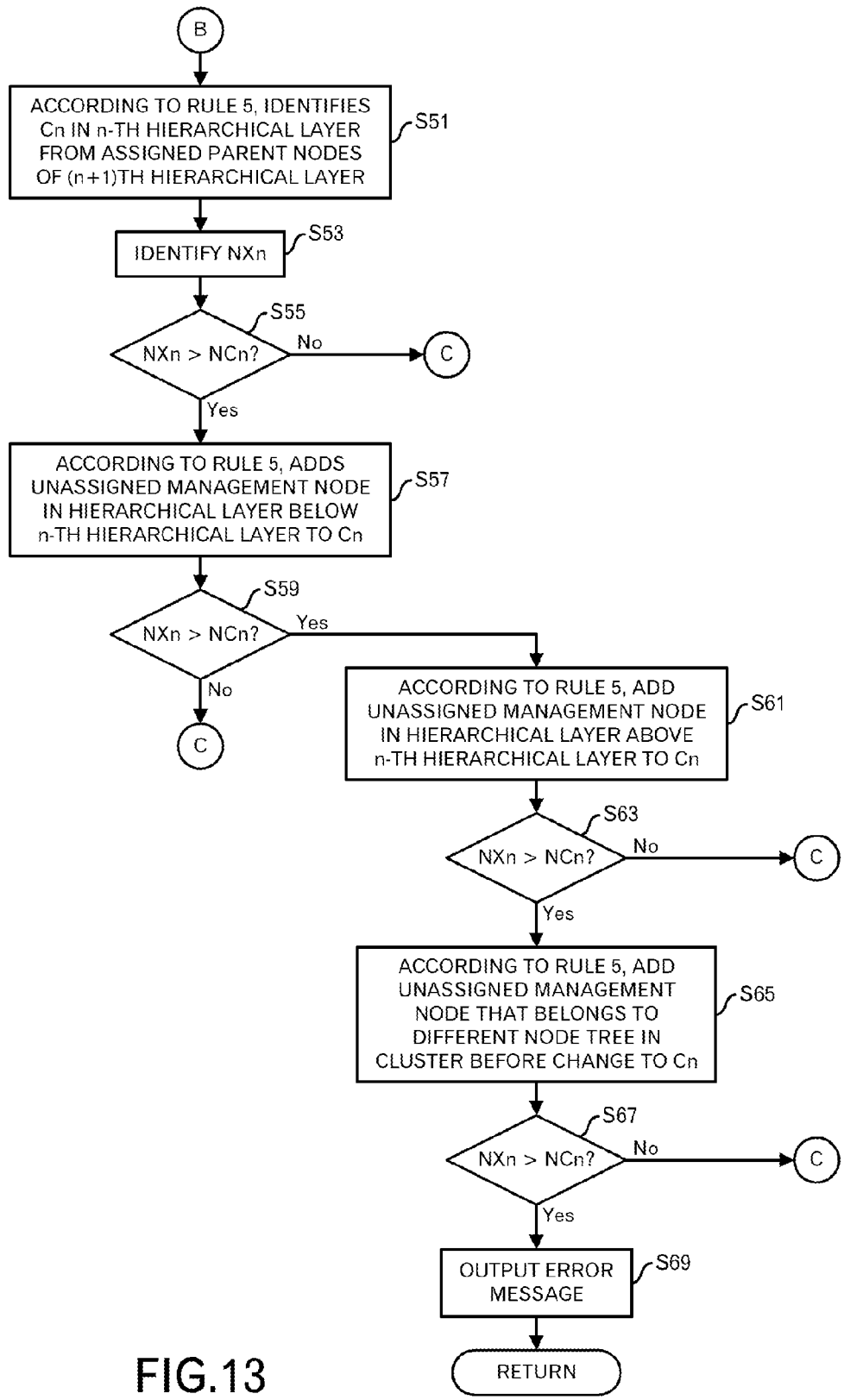
FIG. 13 is a diagram depicting a processing flow of a change processing.

Returning to the explanation of FIG. 13, the change unit 109 identifies, from the number of management nodes in each hierarchical layer that were acquired in step S7, the number of management nodes of the management node group Xn in the n-th hierarchical layer (step S53). The change unit 109 then determines whether (the number of management nodes of node group Xn in the n-th layer) is more than (the number of management nodes of the candidate management node group Cn) (step S55). When (the number of management nodes of node group Xn in the n-th layer) is more than (the number of management nodes of the candidate management node group Cn) (step S55: YES route), the number of management nodes of candidate Cn is insufficient. So the change unit 109 adds, according to rule 5, unassigned management nodes in the hierarchical layer below the n-th hierarchical layer to Cn (step S57). On the other hand, when (the number of management nodes of node group Xn in the n-th layer) equals to or is less than (the number of management nodes of the candidate management node group Cn) (step S55: NO route), processing moves to step S45 in FIG. 10 by way of terminal C.

The change unit 109 determines whether (the number of management nodes of the node group Xn in the n-th hierarchical layer) is more than (the number of management nodes of the candidate management node group Cn) (step S59). When (the number of management nodes of the node group Xn in the n-th hierarchical layer) is more than (the number of management nodes of the candidate management node group Cn) (step S59: YES route), the number of management nodes is insufficient. So the change unit 109 adds, according to rule 5, unassigned management nodes in the hierarchical layer above the n-th hierarchical layer to Cn (step S61). On the other hand, when (the number of management nodes of the node group Xn in the n-th hierarchical layer) equals to or is less than (the number of management nodes of the candidate management node group Cn) (step S59: NO route), processing moves to step S45 in FIG. 10 by way of the terminal C.

The change unit 109 determines whether (the number of management nodes of the node group Xn in the n-th hierarchical layer) is more than (the number of management nodes of the candidate management node group Cn) (step S63). When (the number of management nodes of the node group Xn in the n-th hierarchical layer) is more than (the number of management nodes of the candidate management node group Cn) (step S63: YES route), the number of management nodes is insufficient. So the change unit 109 adds, according to rule 5, unassigned management nodes that belong to a different node tree in the cluster before the change to Cn (step S65). On the other hand, when (the number of management nodes of the node group Xn in the n-th hierarchical layer) equals to or is less than (the number of management nodes of the candidate management node group Cn) (step S63: NO route), processing moves to step S45 in FIG. 10 by way of the terminal C.

Figure 15:
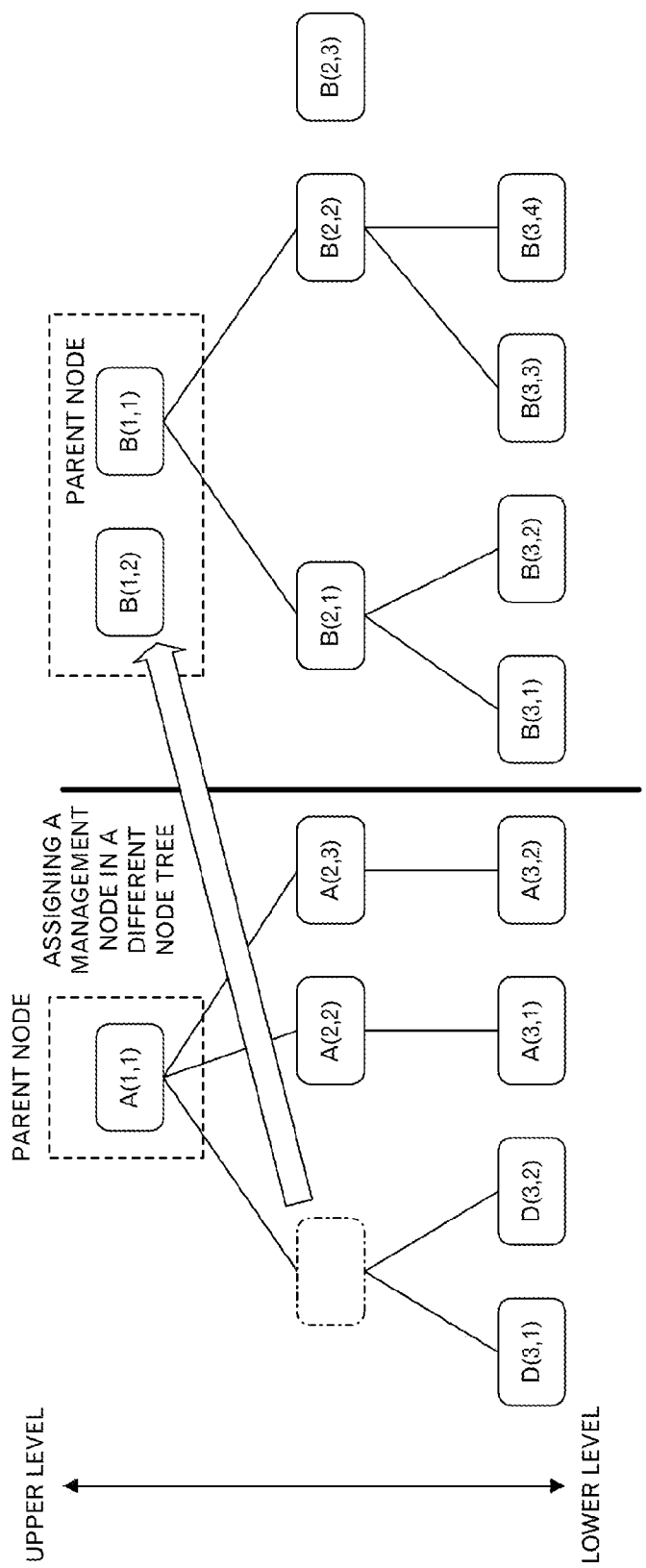
FIG. 15 is a diagram depicting a method of assigning management nodes according to the rules.

After the management nodes of the second hierarchical layer have been determined as presented in FIG. 14, when determining management nodes in the first layer, the management node D(1, 1), which is the parent node of management node A(2, 2) and management node A(2, 3), is assigned for cluster A. And the management node D(1, 2), which is the parent node of management node B(2, 1) and management node B(2, 2), is assigned for cluster B. However, for cluster B, the number of management nodes of the first hierarchical layer is two, and there are not enough management nodes. Therefore, at step S65 example as illustrated in FIG. 15, an unassigned management node from among the management nodes that belong to a different node tree is used as the management node B(1, 2).

Returning to the explanation of FIG. 13, the change unit 109 determines whether (the number of management nodes of the node group Xn in the n-th hierarchical layer) is more than (the number of management nodes of the candidate management node group Cn) (step S67). When (the number of management nodes of the node group Xn in the n-th hierarchical layer) is more than (the number of management nodes of the candidate management node group Cn) (step S67: YES route), there are no management node that can be added. So the change unit 109 generates data for displaying an error message, and outputs that data to a display device (step S69). Processing then returns to the calling-source processing. However, when (the number of management nodes of the node group Xn in the n-th hierarchical layer) equals to or is less than (the number of management nodes of the candidate management node group Cn) (step S67: NO route), processing moves to the step S45 in FIG. 10 by way of the terminal C.

Figure 16:
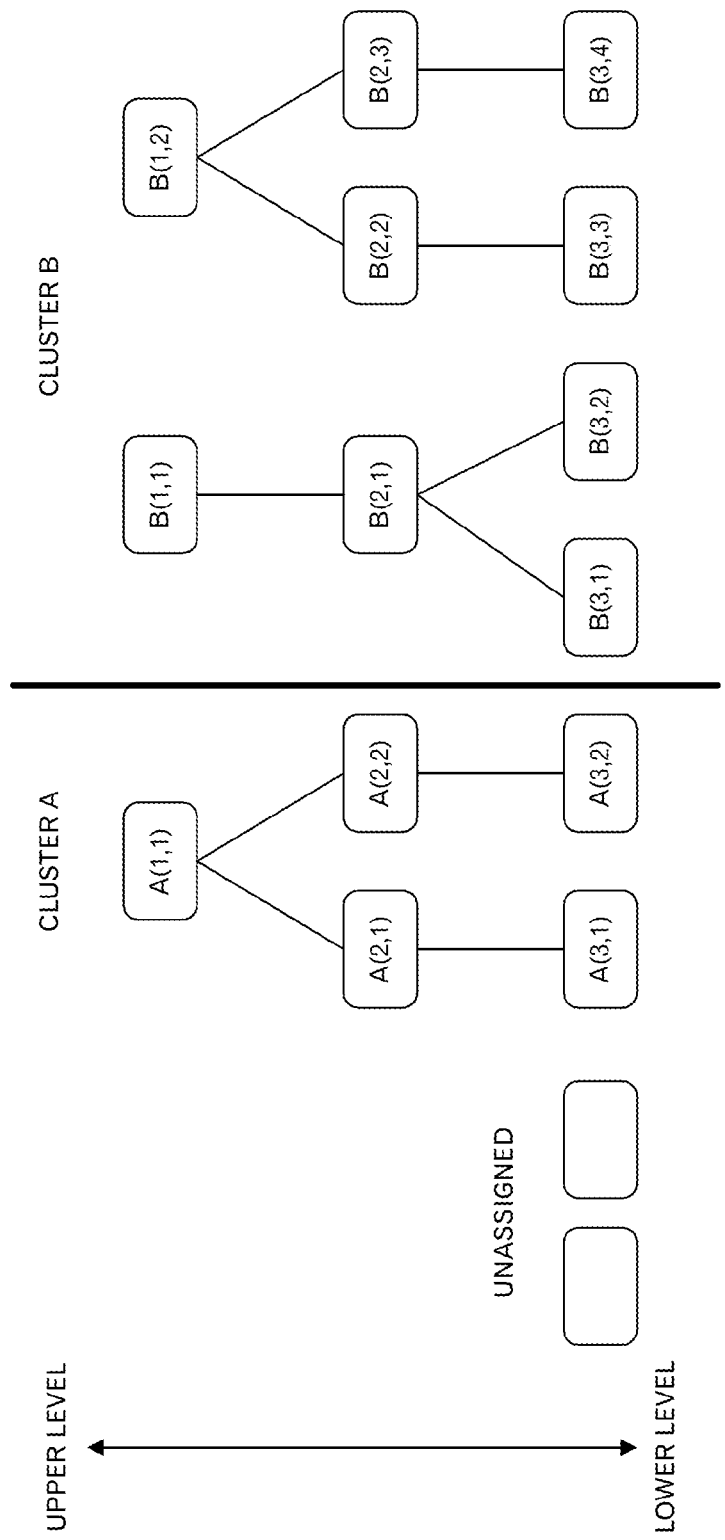
FIG. 16 is a diagram depicting a cluster after a change.

By performing processing such as described above, it becomes possible to create a suitable cluster according to a total amount of computation by computation nodes in the partitions after the change. For example, by performing processing such as described above for the system illustrated in FIG. 8, a system such as illustrated in FIG. 16 is created. Here, the "amount of calculation" by each calculation node is the number of processes, tasks or the like executed by each computation node. And the "total amount of calculation" by the calculation node group is, for example, a total number of processes, tasks or the like executed by plural computation nodes included in the computation node group. The "amount of calculation" by each calculation node can be known by management nodes in the bottom layer that manage each computation node, and the "total amount of calculation" by the calculation node group can be known by management nodes in the bottom layer that manage the calculation node group. Incidentally, unassigned management nodes may be assigned to a different cluster, or maybe added to cluster A and cluster B according to the processing load.

Returning to the explanation of FIG. 9, the change unit 109 updates, based on the result of the change processing (S9), data stored in the node information storage unit 103 (step S11). By the processing of step S11, logical connection relationship after the change is reflected on the node information stored in the node information storage unit 103.

The change unit 109 also updates, based on the result of the change processing (S9), data stored in the partition information storage unit 101 (step S13). Processing then moves to step S15 in FIG. 17 by way of terminal A.

Figure 17:
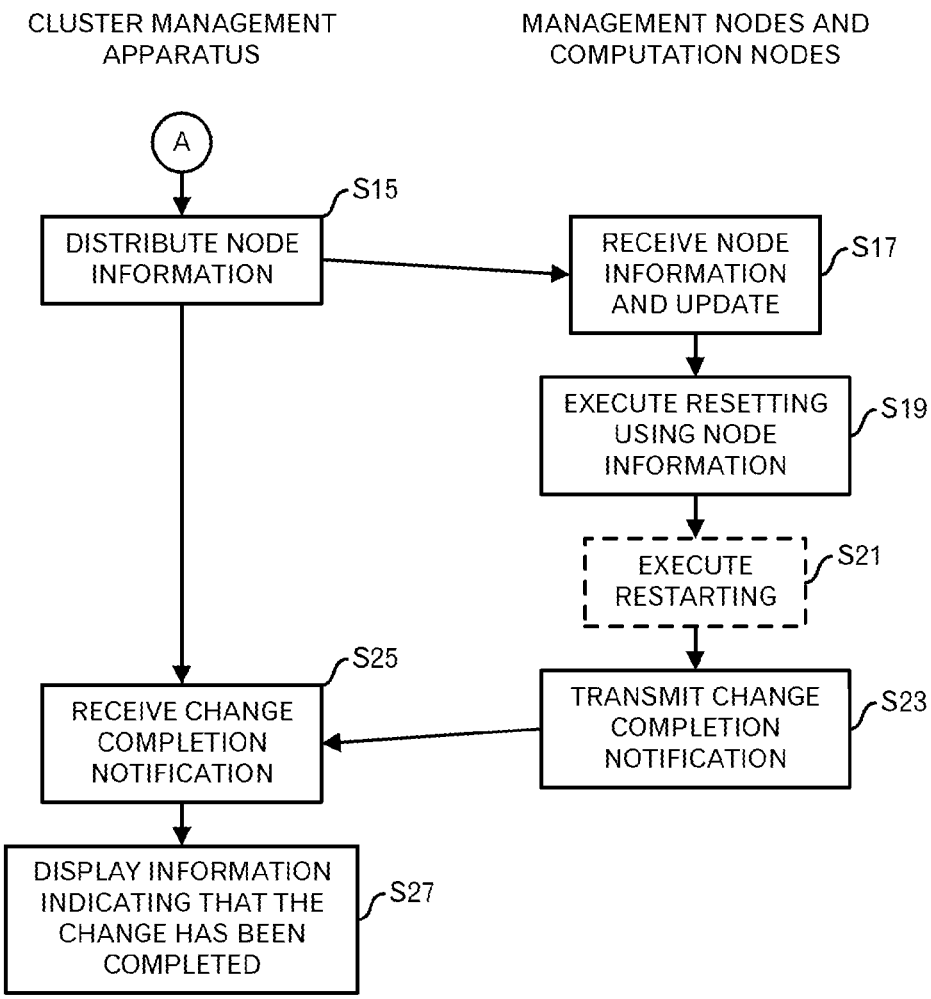
FIG. 17 is a diagram depicting a main processing flow.

Moving to an explanation of FIG. 17, the setting unit 111 transmits node information stored in the node information storage unit 103 to each management node and each computation node (step S15). In step S15, the setting unit 111 transmits, to each management node and each computation node, node information for the node.

The change daemon 71 in each management node and each computation node receives node information from the cluster management apparatus 1, and updates the node information that is stored in the node information storage unit 73 (step S17).

The change daemon 71 uses node information that is stored in the node information storage unit 73 to execute resetting of the node (step S19). In step S19, when the node is a management node, setting for the logical connections with other nodes is performed, and setting for the computation nodes managed by the management node is performed. When the node is a computation node, setting for the logical connections with other nodes is performed, and setting for jobs executed by the computation node is performed.

As a result of resetting in step S19, if restarting is performed, the change daemon 71 restarts the node (step S21). The processing in step S21 is processing that is not executed when restarting does not have to be performed, so the block for step S21 in FIG. 17 is drawn by a dashed line.

After completing resetting of the node, the change daemon 71 transmits a change completion notification to the cluster management apparatus 1 (step S23).

The setting unit 111 in the cluster management apparatus 1 receives a change completion notification from each management node and each computation node (step S25).

After confirming that a change completion notification has been received from each of the management nodes and each of the computation nodes, the setting unit 111 displays information representing that the change has been completed on the display device (step S27). As a result, the user can know that the change of the partition has been completed.

By performing processing such as described above, it is possible to cause each management node and each computation node to perform setting for changing the structure. So changing the structure of a cluster having a hierarchical structure can be performed automatically. Therefore, it is possible to reduce the burden on a worker when changing the structure, and reduce the cost required for changing the structure.

Although the embodiments of this invention were explained, this invention is not limited to the embodiments. For example, the functional block configurations of the aforementioned cluster management apparatus 1, management nodes and calculation nodes may not always correspond to program module configurations.

Moreover, the aforementioned table configurations of the respective tables are mere examples, and may be modified. Furthermore, as for the processing flow, as long as the processing results do not change, the turns of the steps may be exchanged or the steps may be executed in parallel.

Moreover, in an example aforementioned above, explained two clusters were generated from one cluster. However, this embodiment can be applied similarly to the case that the number of clusters is one or more than two.

Moreover, in an example aforementioned above, a cluster, which has three hierarchical layers, were generated. However, the number of hierarchical layers is not limited to three. For example, by storing policy information defining a hierarchical structure, which has more than three hierarchical layers (for example, data illustrated in FIG. 18), a cluster which has more than 3 hierarchical layers can be generated. Moreover, the processing of this embodiment can be applied to the case that a cluster has less than three hierarchical layers (for example, two hierarchical layers).

Figure 19:
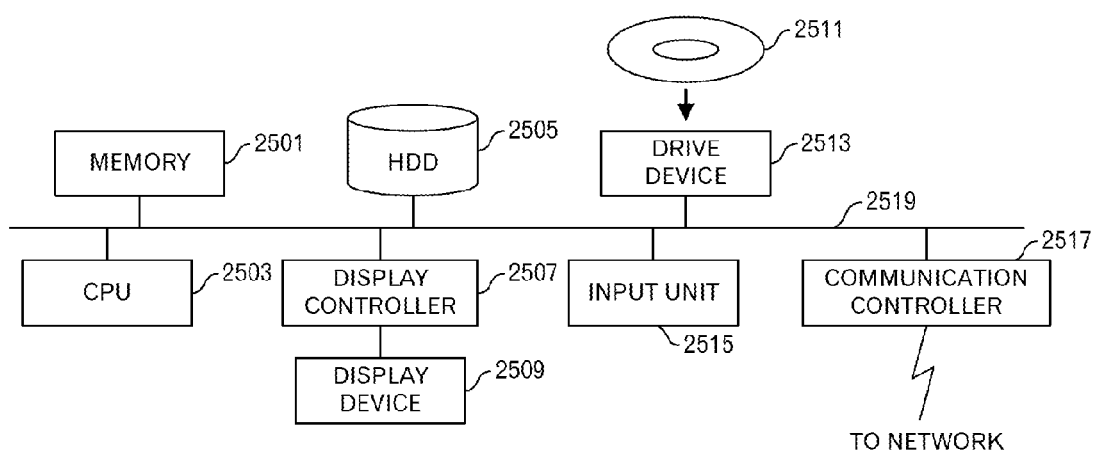
FIG. 19 is a functional block diagram of a computer.

In addition, the aforementioned cluster management apparatus 1, management nodes, and calculation nodes are computer device as illustrated in FIG. 19. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as illustrates in FIG. 19. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The embodiments described above are summarized as follows:

A management method relating to a first aspect of the embodiments includes (A) calculating, for each of partitions generated by dividing a plurality of calculation nodes, a total calculation amount of calculation nodes included in the partition by using calculation amounts managed by a plurality of management nodes, wherein the plurality of calculation nodes, the plurality of management nodes which are connected in a tree form and each of which has a storage unit storing calculation amounts of calculation nodes which are management targets, and a management apparatus which manages connection among the plurality of management nodes are included in an information processing system; (B) assigning, for each of the partitions, management nodes among the plurality of management nodes to a predetermined layer in which the management nodes manage calculation nodes included in the partition, based on the total calculation amount of calculation nodes included in the partition; and (C) connecting the plurality of management nodes in a way that management nodes in a layer above the predetermined layer manage the management nodes in the predetermined layer.

By employing the aforementioned configuration, it becomes possible to avoid selecting calculation nodes for each management node in the bottom layer. Therefore, it becomes possible to reassign management nodes easily.

Furthermore, the connecting may include (b1) assigning, for each of the partitions, management nodes, which are in the predetermined layer before dividing and are connected to a certain management node in a layer above the predetermined layer, to the predetermined layer in which the management nodes manage calculation nodes in the partition. By employing the aforementioned configuration, it becomes possible to reduce processing for changing the setting and so on resulting from reassigning the management nodes. This is because plural adjacent management nodes before dividing are assigned to the same group.

Moreover, the connecting may include (b2) assigning management nodes in order from a bottom layer to a top layer; and (b3) assigning management nodes, which are connected to a management node assigned to a layer one layer below the predetermined layer, to a layer above the predetermined layer. By employing the aforementioned configuration, it becomes possible to reduce processing for changing the setting and so on resulting from reassigning the management nodes. This is because connection relationship between management nodes in the layer one layer below the predetermined layer and management nodes in the layer above the predetermined layer is utilized.

Moreover, the plurality of management nodes may include a plurality of node trees in which management nodes are connected in a tree form. Then, the connecting may include (b4) assigning, for each of the partitions, management nodes in a node tree different from a node tree in which management nodes manage calculation nodes in the partition. By employing the aforementioned configuration, it becomes possible to assign management nodes flexibly.

A management method relating to a second aspect of the embodiments includes (D) receiving an instruction which instructs to change a setting for connection among plural management nodes after grouping plural calculation nodes into plural groups, wherein the plural calculation nodes, the plural management nodes which are connected in a certain tree form and manage the plural calculation nodes, and the computer which manages the connection among the plural management nodes are included in an information processing system; (E) specifying for each of the plural groups, a tree form corresponding to the number of calculation nodes included in the group by using a storage unit storing data defining a tree form corresponding to each range of the number of calculation nodes; and (F) changing the setting for the connection among the plural management nodes to generate, for each of the plural groups, a tree of management nodes, which manage calculation nodes included in the group, in the specified tree form.

By employing the aforementioned configuration, it becomes possible to avoid selecting calculation nodes for each management node in the bottom layer. Therefore, it becomes possible to reassign management nodes easily.

Furthermore, the changing may include (f1) assigning plural management nodes, which are in a certain layer of a tree in the certain tree form and satisfy a condition that the plural management nodes are connected to a certain node in a layer above the certain layer, to the same group. By employing the aforementioned configuration, it becomes possible to reduce processing for changing the setting and so on resulting from reassigning the management nodes. This is because plural adjacent management nodes in the tree in the certain tree form are assigned to the same group.

Furthermore, the changing may include (f2) assigning management nodes to each layer of the tree for the group in order from the bottom layer to the top layer; and (f3) assigning, to a certain layer other than the bottom layer of the tree for the group, management nodes connected to a certain node, which is assigned to a layer 1 layer below the certain layer, in a tree in the certain tree form. By employing the aforementioned configuration, it becomes possible to reduce processing for changing the setting and so on resulting from reassigning the management nodes. This is because connection relationship between management nodes in a specific layer and management nodes in the layer 1 layer above the specific layer is utilized.

Moreover, a tree in the certain tree form may include a first tree and a second tree. Then, the changing may include (f4) assigning management nodes included in the first tree and management nodes included in the second tree to different groups. By employing the aforementioned configuration, it becomes possible to reduce processing for changing the setting and so on resulting from reassigning the management nodes. This is because management nodes included in the same tree are assigned to the same group.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk or the like. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a management apparatus to execute a process, the process comprising:
    calculating, for each of partitions generated by dividing a plurality of calculation nodes, a total calculation amount of calculation nodes included in the partition by using calculation amounts managed by a first cluster including a first plurality of management nodes, wherein the plurality of calculation nodes, the first plurality of management nodes which are connected in a tree form and each of which has a storage unit storing calculation amounts of calculation nodes which are management targets, and the management apparatus which manages connection among the first plurality of management nodes are included in an information processing system;
    assigning, to each of the partitions, a second plurality of management nodes selected from the first cluster, based on the total calculation amount of calculation nodes included in the partition; and
    connecting, for each of the partitions, the second plurality of management nodes to generate a second cluster, and
    wherein the assigning comprises assigning the second plurality of management nodes in order from a bottom layer of the second cluster to a top layer of the second cluster, management nodes in a first certain layer of the second cluster are selected from a second certain layer of the first cluster, and management nodes in a layer above the first certain layer of the second cluster are selected from a layer above the second certain layer of the first cluster.

2. The computer-readable, non-transitory storage medium as set forth in claim 1, wherein the assigning comprises:
    assigning management nodes, which are in a same layer of the first cluster and are connected to a same management node in a layer above the same layer of the first cluster, to a same layer of the second cluster.

3. A management method, comprising:
    calculating, by using a computer, for each of partitions generated by dividing a plurality of calculation nodes, a total calculation amount of calculation nodes included in the partition by using calculation amounts managed by a first cluster including a first plurality of management nodes, wherein the plurality of calculation nodes, the first plurality of management nodes which are connected in a tree form and each of which has a storage unit storing calculation amounts of calculation nodes which are management targets, and the computer which manages connection among the first plurality of management nodes are included in an information processing system;
    assigning, to each of the partitions and by using the computer, a second plurality of management nodes selected from the first cluster, based on the total calculation amount of calculation nodes included in the partition; and
    connecting, for each of the partitions and by using the computer, the second plurality of management nodes to generate a second cluster, and
    wherein the assigning comprises assigning the second plurality of management nodes in order from a bottom layer of the second cluster to a top layer of the second cluster, management nodes in a first certain layer of the second cluster are selected from a second certain layer of the first cluster, and management nodes in a layer above the first certain layer of the second cluster are selected from a layer above the second certain layer of the first cluster.

4. An information processing system, comprising:
    a plurality of calculation nodes;
    a first plurality of management nodes which are included in a first cluster and are connected in a tree form, and each of which has a storage unit storing calculation amounts of calculation nodes which are management targets; and
    a management apparatus which manages connection among the first plurality of management nodes,
    wherein the management apparatus comprises:
    a memory; and
    a processor configured to use the memory and execute a process, the process comprising:
        calculating, for each of partitions generated by dividing the plurality of calculation nodes, a total calculation amount of calculation nodes included in the partition by using calculation amounts managed by the first plurality of management nodes;
        assigning, to each of the partitions, a second plurality of management nodes selected from the first cluster, based on the total calculation amount of calculation nodes included in the partition; and
        connecting, for each of the partitions, the second plurality of management nodes to generate a second cluster, and
        wherein the assigning comprises assigning the second plurality of management nodes in order from a bottom layer of the second cluster to a top layer of the second cluster, management nodes in a first certain layer of the second cluster are selected from a second certain layer of the first cluster, and management nodes in a layer above the first certain layer of the second cluster are selected from a layer above the second certain layer of the first cluster.

* * * * *